(No Model.)
B. S. KEARNEY.
WAGON END GATE.
No. 446,232. Patented Feb. 10, 1891.
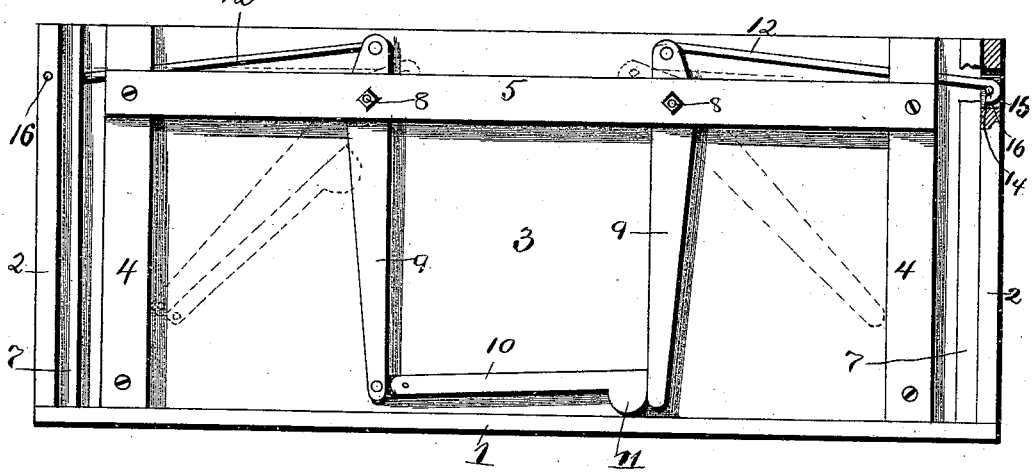
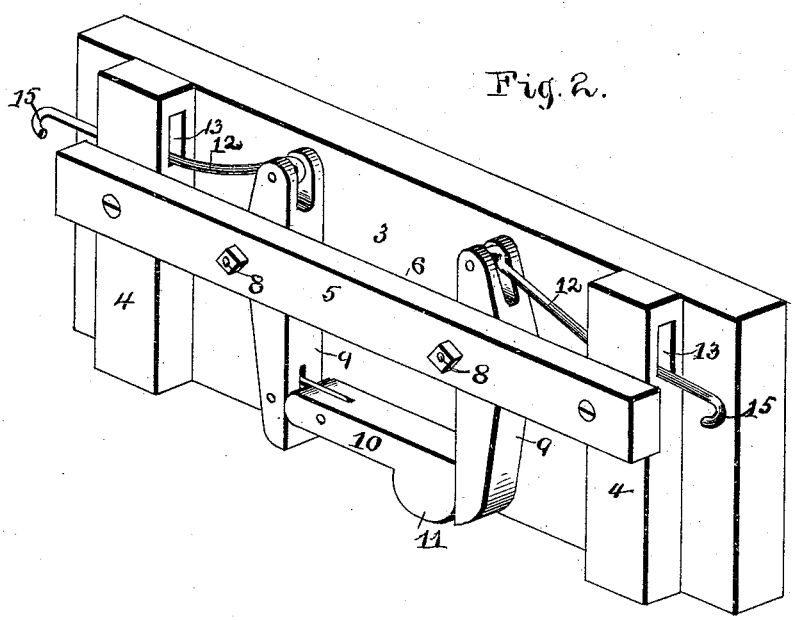
Witnesses
H. G. Seitz
H. J. Riley
Inventor
Benjamin S. Kearney
By his Attorneys,
C. A. Snow & Co.

UNITED STATES PATENT OFFICE.

BENJAMIN S. KEARNEY, OF FRANKLINTON, NORTH CAROLINA, ASSIGNOR OF ONE-HALF TO NEEDHAM Y. GULLEY, OF SAME PLACE.

WAGON END-GATE.

SPECIFICATION forming part of Letters Patent No. 446,232, dated February 10, 1891.

Application filed October 29, 1890. Serial No. 369,745. (No model.)

*To all whom it may concern:*

Be it known that I, BENJAMIN S. KEARNEY, a citizen of the United States, residing at Franklinton, in the county of Franklin and State of North Carolina, have invented a new and useful End-Gate, of which the following is a specification.

My invention relates to improvements in end-gates for wagons, carts, and the like, its object being to obtain greater ease and rapidity in removing and replacing said gates when for any purpose, such as loading and unloading, it is desirable or necessary to remove the gates; also, to insure greater security for the same, so that the gates will not become unlocked and fall out while the vehicle is in motion. This is accomplished by mechanism to be hereinafter described, and then pointed out in the claims.

In the accompanying drawings, Figure 1 is an end view of the body of a wagon or cart provided with my improved mechanism for locking the end-gate. Fig. 2 is a detail view of the end-gate removed.

The body of the wagon as shown consists of the bottom or floor 1 and sides 2.

3 is an end-gate, which is provided near each end with battens 4, and extending across the end-gate near the top thereof is a horizontal cross-bar 5, the ends of which are secured on the outer sides of said battens, providing a space 6 between the cross-bar and the end-gate.

7 represents the cleats secured to the sides of the body for providing the grooves in which the end-gate slides. Fulcrumed at 8, between the cross-bar 5 and the end-gate in said space 6, are vertical levers 9, two in number, the upper ends of which extend a short distance above said cross-bar and the lower ends of which extend down nearly to the floor 1. At the lower end of one of the levers 9 is pivoted a lock-bar 10, the outer end of which has a head 11, adapted to contact with the lower end of the other lever 9 and be supported upon the floor 1. Extending toward the sides 2 of the body and pivoted at the upper ends of the levers 9, above the cross-bar 5, are rods 12, which extend through openings 13 in the battens 4 and through openings 14 in the sides 2, and are provided at their outer ends with hooks or catches 15. Secured in the openings 14 of the sides 2 of the body are staples or pins 16, which span or extend across the openings 14.

When the end-gate is to be locked, the rods 12 that are carried by the end-gate are forced out through the openings 14 in the sides 2 by the throwing in of the lower ends of the levers 9 toward each other and the hooks or catches 15 allowed to engage over the staples or pins 16. To securely lock the gate the lock-bar 10, carried by one of the levers 9, is forced down into horizontal position, with its head 11 engaging the other lever 9 and resting upon the floor 1, thus spreading the levers apart and locking them. When the gate is to be unlocked, the lock-bar is thrown upwardly and the levers 9 drawn slightly toward each other, so as to disengage the hooks 15 from the staples or pins 16. The rods 12 being now raised, they may be forced inwardly toward each other, thus drawing their hooks in through the openings 14 of the sides 2.

A wagon end-gate provided with locking mechanism as above described will enable the same to be readily and surely locked to the body of the vehicle, and any jolting movement of the vehicle cannot release the lock. It is evident that my improvement may be applied to a hinged end-gate, as well as to a sliding end-gate.

What I claim is—

1. In combination with the end-gate, the herein-described locking mechanism for the end-gate, comprising a pair of levers pivoted to the end-gate, rods pivoted to the upper ends of the levers and provided with hooks or catches at their outer ends, staples or pins extending across openings in the sides of the body and adapted to be engaged by said hooks or catches, and a bar hinged to one of the levers and arranged to engage the other lever for locking said rods, substantially as set forth.

2. The combination, with an end-gate, of the levers 9, pivoted to the end-gate, the rods connected to the upper ends of the levers 9 and arranged to engage the body of a wagon, and the bar 10, hinged to the lower end of one of the levers and arranged to engage the other lever, substantially as described.

3. In combination with the end-gate, the herein-described locking mechanism for the end-gate, comprising a pair of levers pivoted to the end-gate, rods pivoted to the levers and provided with hooks or catches at their outer ends, staples or pins extending across openings in the sides of the body and adapted to be engaged by said hooks or catches, and a pivoted lock-bar between the lower ends of said levers, substantially as set forth.

4. In combination with the end-gate, the herein-described locking mechanism for the end-gate, comprising a pair of levers pivoted to the end-gate, rods pivoted to the levers and provided with hooks or catches at their outer ends, staples or pins extending across openings in the sides of the body and adapted to be engaged by said hooks or catches, and a lock-bar pivoted to the lower end of one of said levers and adapted to engage the lower end of the other of said levers, substantially as set forth.

5. In combination with the end-gate, the herein-described locking mechanism for the end-gate, comprising a pair of levers pivoted to the end-gate, rods pivoted to the levers and provided with hooks or catches at their outer ends, staples or pins extending across openings in the sides of the body and adapted to be engaged by said hooks or catches, and a lock-bar pivoted to the lower end of one of said levers and provided at its outer end with a head adapted to engage the other of said levers and to rest upon the floor of the body, substantially as set forth.

6. In combination with the end-gate, the herein-described locking mechanism, comprising a pair of levers pivoted to the end-gate, rods pivoted to the levers, means for securing the outer ends of the rods to the sides of the vehicle, and a pivoted lock-bar between the levers, substantially as set forth.

In testimony that I claim the foregoing as my own I have hereto affixed my signature in presence of witnesses.

BENJAMIN S. KEARNEY.

Witnesses:
N. Y. GULLEY,
B. W. BALLARD.